Feb. 22, 1927.

D. W. ALLMAN 1,618,362

SIPHON FOR FLUSH TANKS

Filed Feb. 26, 1926

Inventor.
David W. Allman.

Patented Feb. 22, 1927.

1,618,362

UNITED STATES PATENT OFFICE.

DAVID WILLIAM ALLMAN, OF TORONTO, ONTARIO, CANADA.

SIPHON FOR FLUSH TANKS.

Application filed February 26, 1926. Serial No. 90,916.

The principal objects of the invention are to greatly simplify the mechanical apparatus within flush tanks thereby effecting a material saving in cost and to devise an apparatus which may be operated either automatically or manually by means of the water supply pressure and which will effect a marked saving in the amount of water used.

The principal feature of the invention consists in the novel construction of the means for discharging water from the tank whereby a sudden application of pressure to a repressed column of water in the siphon structure is effected to start the upward flow of the repressed column of water in the siphon.

In the drawings, Figure 1 represents a vertical sectional view of a tank showing my improved construction of automatic siphoning device.

Figure 1:
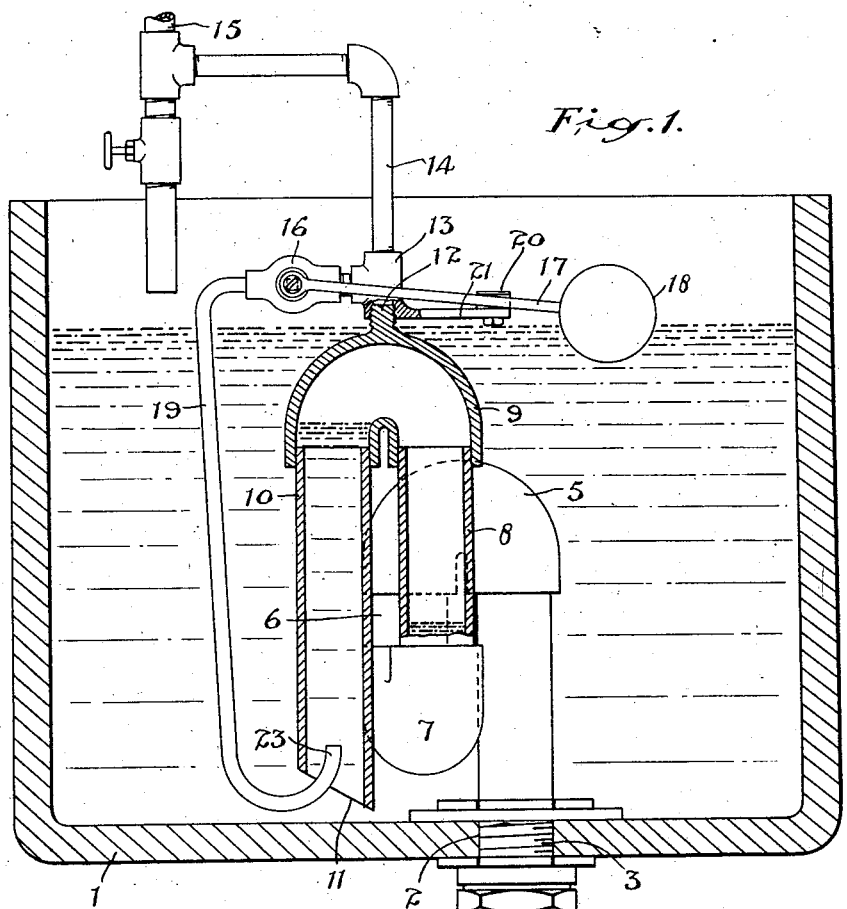
Figure 2:
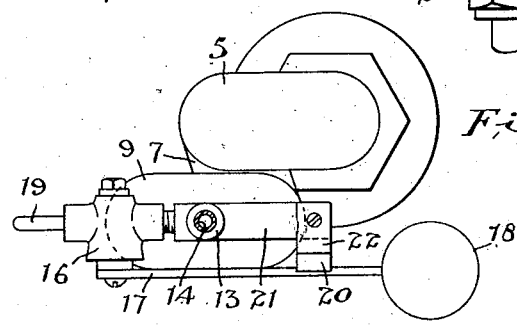
Figure 2 is a plan view of the siphon structure illustrated in Figure 1.
Figure 3:
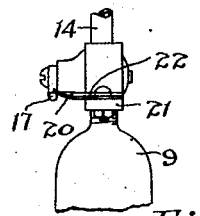
Figure 3 is an elevational detail of the spring means for retarding the upward movement of the valve float.

In the construction herein shown, the tank 1 is of an ordinary type used for automatic flushers having an outlet opening 2 and in this opening is secured the pipe 3 connected with the discharge pipe 4. The pipe 3 extends vertically upward into the tank and to the upper end thereof is secured a return bend connection 5 and to this connection is secured a short nipple 6 which supports a reversely arranged return bend fitting 7.

A vertical pipe length 8 extends upwardly from the fitting 7 and supports the return bend fitting 9 at a higher level than the fitting 5. A pipe 10 extends downwardly from the fitting 9 and forms the inlet end of the siphon, the lower bevelled end 11 thereof extending close to the bottom of the tank so that the siphon will break immediately the upper portion of the bevel is uncovered.

The fitting 9 is formed with a stud 12 on the top, upon which is secured a T pipe fitting 13 which is connected with a suitable water pressure supply by the pipe 14. This pipe is preferably connected with the water supply pipe 15 for filling the tank.

A simple plug valve 16 is connected to the T fitting 13 and its operating spindle is connected to an arm 17 carrying a float 18. A pipe 19 leads from the valve 16 to the inlet end of the pipe 10 of the siphon.

It will be noted that the nipple 6, the fitting 7 and the pipe 8 form a trap in the siphon tube and this will remain filled with water to the level of the bend of the fitting 5 when the siphon breaks.

As the tank fills with water a column of water rises in the pipe 10 but its rise is restricted by the air which becomes trapped between the water closing the bottom end of pipe 10 and the water held in the trap 7. The air thus trapped is compressed and though the tank is filled above the fitting 7 the water in pipe 10 does not flow past the bend 9.

It will be readily understood that if a slight upward impetus is given to the column of water within the pipe 10 a quick overflow will occur in the fitting 9 and the balance of the water in the inner section of the trap will be overcome and it will flood into the vertical discharge 3 below the fitting 5. Immediately this takes place a very strong suction is created which siphons the water from the tank.

The desired impetus to the column of water in the pipe 10 may be imparted by a small jet of water under pressure and this is applied at the bottom of the pipe 10 through the pipe 19 when the tank has been filled and the siphonic action commences. It is of course necessary that the jet of water be suddenly applied and in order to effect the quick opening of the valve 16 means must be provided for retarding the action of the float at the upper end of its movement.

A simple means for accomplishing this result is shown in the form of a flat spring 20 secured to a bracket 21 arranged on the fitting 13. This spring is very light in order to allow the float to spring past it easily in its downward movement but a second and stronger spring plate 22 is arranged above the spring 20, this latter spring being shorter than the spring 21. As the float rises it engages the end of the spring 20 and both springs act to hold it until the float is nearly submerged and when the pressure on the float overcomes the resistance of the springs the float jumps clear and opens the valve 16 with a sudden movement, thus directing a jet of water under pressure from the nozzle end 23 of the pipe 19. It will of course be understood that other means for effecting the sudden opening of the valve 16 may be devised.

The action is extremely simple and provides an operating discharge for a flush tank which will prevent leakage and will operate effectively under varying pressure in the applied actuating element. Further, the construction is so extremely simple that the cost is reduced to the very minimum and there are practically no working parts to get out of order.

The operation of the device as thus described is automatic but it may be made subject to manual control by simply providing a manually operated valve for the valve 16 and its operating float.

Figure 4:
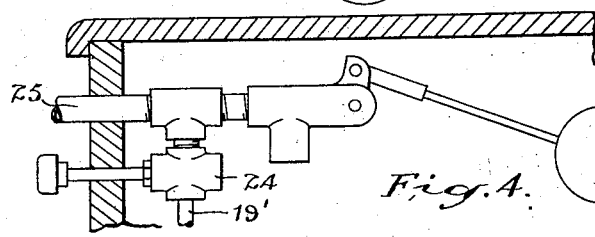
Figure 4 is an elevational detail showing a manual control for the siphon.

Figure 4 shows the application of a manual control valve 24 connected to the supply pipe 25. This is a simple plunger valve which when pushed in allows a jet of water to flow through the pipe 19′ which corresponds to the pipe 19 illustrated in Figure 1.

It has been shown herein that the column of water in the siphon may be displaced by a jet of water projected into the lower end of the tube but it must be understood that such displacement may be effected by the sudden application of pressure of any kind.

What I claim as my invention is:—

1. A siphon for flush tanks comprising, a siphon arranged within the tank having a self-sealing trap in the outlet thereof, and means for effecting a sudden application of pressure to the repressed column of water in said siphon to start its flow in the direction of said trap.

2. A siphon for flush tanks comprising, a siphon arranged within the tank, and having a water sealed trap at the outlet thereof, a pressure supply, a pipe leading from the pressure supply to the entrance of the siphon, and means for suddenly directing pressure through said pipe to the siphon to break said water seal.

3. A siphon for flush tanks comprising, a water trapped siphon arranged within the tank, a pressure supply, a pipe leading from the pressure supply to the entrance of the siphon, a valve in said pressure pipe, and means controlled by the body of water in the tank for opening said valve.

4. A siphon for flush tanks comprising, a water trapped siphon arranged within the tank, a pressure supply, a pipe leading from the pressure supply to the entrance of the siphon, a valve in said pressure pipe, a float connected with said valve, and means for retarding the movement of the float adapted to release it suddenly to open said valve.

5. A siphon for flush tanks comprising, a trapped siphon arranged within the tank, a pressure supply, a pipe leading from the pressure supply to the entrance of the siphon, a valve in said pressure pipe, a float connected with said valve, and a spring arranged in the path of movement of the float adapted to retard its upward movement and to release it suddenly.

6. A siphon for flush tanks comprising, a trapped siphon arranged within the tank, a pressure supply, a pipe leading from the pressure supply to the entrance of the siphon, a valve in said pressure pipe, a float connected with said valve, and a spring extending over the arm of the float adapted to engage and retard the upward movement thereof and to suddenly release said arm, said spring allowing the free return of said arm.

7. A siphon for flush tanks, comprising a siphon tube having a trap and an end extending downwardly from above said trap, a pressure supply pipe, a valve in said pressure supply pipe, a pipe leading from said valve to the open end of the siphon tube and projecting upwardly thereinto, a float adapted to open said valve upon the rising of water in the tank to a predetermined level, and means for controlling the movement of said float.

8. A siphon for flush tanks, comprising an outflow pipe extending vertically upward from the discharge opening of the tank, a return bend at the top of said pipe, a nipple extending downwardly from said bend, a return bend at the lower end of said nipple, a vertical pipe extending upwardly from the second return bend, a third return bend secured to said vertical pipe, a pipe extending downwardly from the latter return bend to a point near the bottom of the tank and having a beveled end, and means for overbalancing the column of water in the siphon structure formed by said pipes and bends.

DAVID WILLIAM ALLMAN.